INVENTORS
LOUIS A. DEROSA
MICHAEL J. DITORO
LAURIN G. FISCHER
BY R. P. Morris
ATTORNEY INVENTORS
LOUIS A. DEROSA
MICHAEL J. DITORO
LAURIN G. FISCHER
BY [signature]
ATTORNEY Sept. 20, 1955 L. A. DE ROSA ET AL 2,718,638

SIGNAL CORRELATION RADIO RECEIVER

Filed Jan. 20, 1950 4 Sheets-Sheet 3

INVENTORS
LOUIS A. DEROSA
MICHAEL J. DITORO
LAURIN G. FISCHER

BY R. P. Morris
ATTORNEY

SIGNAL CORRELATION RADIO RECEIVER

Filed Jan. 20, 1950 4 Sheets-Sheet 4

INVENTORS
LOUIS A. DEROSA
MICHAEL J. DITORO
LAURIN G. FISCHER
BY R. P. Morris
ATTORNEY 2,718,638

SIGNAL CORRELATION RADIO RECEIVER

Louis A. De Rosa and Michael J. Di Toro, Bloomfield, and Laurin G. Fischer, North Arlington, N. J., assignors to International Telephone and Telegraph Corporation, a corporation of Maryland Application January 20, 1950, Serial No. 139,664

19 Claims. (Cl. 343—113)

This invention relates to radio receiver circuits and more particularly to receiver circuits in which the effect of noise or other interference is mitigated by correlation of the signal modulation and a locally produced signal wave.

Various types of systems wherein a received wave is compared in a correlation circuit with a local wave have been proposed. As an example, the normal homodyne receiver may be cited wherein the received carrier wave is matched by a locally supplied carrier wave of the same frequency of that received. The local supply may be provided by a local source of energy or may be derived from the carrier components of the received signal.

Other types of correlation receivers have been proposed, for example, in a distance or altitude measuring system wherein the carrier wave of the transmitted pulse is adjusted in a delay or phasing network and added to the carrier frequency of the received pulse so as precisely to trigger the apparatus when coincidence in phase between these two combined waves occurs. A further type of signal correlation is known, for example, in U. S. Patent No. 2,358,448. In this system as described multiplication of the detected signal envelope and the locally generated envelope wave is provided. The indications received are of highest amplitude when the locally generated wave has the same amplitude and shape and repetition rate as the signal modulation on the received wave.

It is a clear that in any transmission systems where the shape of the signal wave is known or can readily be determined at the receiver and in which the intelligence is carried by this wave shape, the correlation of the received signal wave with a locally generated wave will serve to reproduce the desired signal at an amplitude greater than that which would otherwise be produced thus reducing the effects of noise energy which itself is random in nature. In these prior art systems it will be noted that the correlation is effected between two waves of the same frequency, that is either the carrier wave or the signal envelope.

It is an object of our invention to provide a radio receiver of the signal correlation type wherein comparison is made at a carrier frequency or intermediate frequency by means of a locally generated signal which is used to modulate the signal modulated carrier, the necessary delay or phasing adjustment being made to produce side-band energy by this multiplication or modulation correlated with the initial side-band energy received.

In accordance with a feature of this invention there is provided a radio receiver for receiving the signal modulated carrier wave. This wave is applied at its original frequency or is first reduced to an intermediate frequency and applied to a mixer circuit which effectively may produce a multiplication of this input wave with a locally supplied wave. The locally supplied wave preferably has the same shape and amplitude as the original signal wave carried by the received energy. This wave is then applied to the mixer circuit to produce a multiplication between the locally generated wave and the carrier frequency, thus producing side-band energy of the same characteristics as the signal side-band of the received energy. Means is provided to control the phase or time delay of the locally generated wave so that the side-bands will coincide with those of the received energy. These side-bands may be related in the same phase as the received signal side-bands or may be in phase opposition. In either case, they will not coincide with the random noise signals incoming over the system and therefore will serve to reduce noise distortion from the received signal energy. The output energy from the mixer is then detected to derive the desired signal wave which may then be integrated, as for example, by a low pass filter and used to supply energy to a signal indicator.

More particularly the invention may comprise a receiver for any energy or noise envelope pattern the output of which is supplied either at the receiver carrier frequency or at some intermediate carrier frequency to a mixing circuit which may comprise a balanced modulator for example. This energy is supplied to the balanced modulator in push-pull relationship so that in the absence of the correlating wave there will be no output of either signal or noise. The local supply wave is applied to the modulator in parallel. Thus the side-band energy only will appear in the output of the receiver. By adjusting the phasing or time relationship of the locally supplied wave the two side-band waves appearing in the output of the modulator may be made to coincide or alternatively to cancel one another. This energy may then be supplied to a rectifier and the storage filter. The information of the message may be achieved by noting the adjustment required for the phasing or delay circuit to obtain a maximum or minimum output from the system. Alternatively the direct indication of the output signal may be provided.

Instead of applying the locally generated signal wave directly to the modulator the wave may be first differentiated and applied to the multiplying circuit. In this case the finally detected envelope will have a zero output when properly adjusted to the maximum or epoch of the signal wave itself and will have a positive or negative sign on opposite sides thereof. With this system it is clear that an arrangement may be readily provided automatically to adjust the timing circuit for the signal epoch.

While described above the balanced modulator was mentioned as the multiplying circuit it is clear that other types of circuits may be used as well. For example, the locally supplied wave may be applied as a gain control voltage on an intermediate frequency amplifier to produce the modulation. Alternatively, the locally supplied wave may be applied to produce plate modulation or may be applied to the control grid, screen grid or suppressor grid in the normal manner of modulator circuits.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
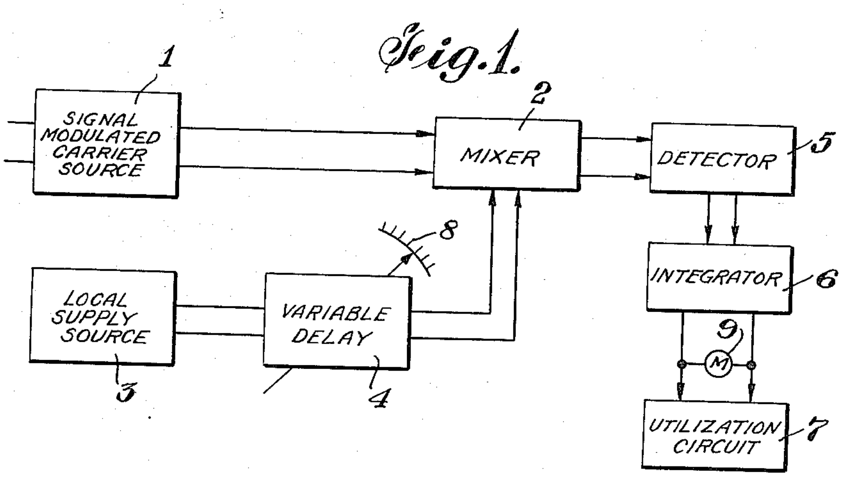
Fig. 1 is a block diagram illustrating the general principles of this invention.

Turning first to Fig. 1, a signal modulated carrier source is shown at 1, the output energy of which is applied to a mixer 2. A local signal supply source 3, supplied energy through a variable delay device 4 also to mixer 2. Here the signal modulated carrier energy is further modulated by the energy from source 3. This output energy from mixer 2 is then applied to a detector 5 and through an integrator 6 to a utilization circuit 7. It will be evident that signals from source 3 will produce side-bands on the carrier frequency present in the mixer 2 which are identical with the signal modulation side-bands except for phasing. The variable delay device may be adjusted until these auxiliary side-bands are in phase or in phase opposition to the signal side-bands received. The adjustment of the variable delay device may be noted in the scale 8. When the delay device 4 is adjusted to provide phase coincidence of the side-band energy then the output from integrator 6 will be a maximum at this point. This maximum energy may be noted by means of a meter 9 connected in the output integrator 6. On the other hand, if the carrier wave side-bands are in phase opposition then the detected energy will be substantially zero or the minimum and this likewise can be read by means of meter 9. It will be clear that incident noise or other interference present in source 1 will not be correlated with the side-band energy produced by modulations from signal source 3 so that this noise energy will not provide an effective indication in meter 9. It is accordingly seen that this type of circuit will provide an arrangement wherein coincidence of the waves may be noted even in the presence of very high noise or other interference.

Figure 2:
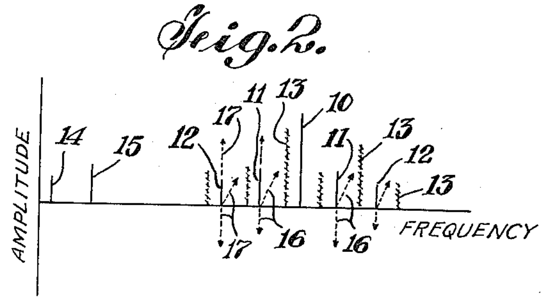
Fig. 2 is a graphical representation used in explaining the operation of the system of Fig. 1.

Turning now to Fig. 2, a diagram is given illustrating the operation of the system of Fig. 1. The signal modulated carrier wave is shown at 10 and the side-bands at 11 and 12 respectively. The randomly distributed lines 13 represent interference which may be radio frequency noise or some unwarranted modulation of the carrier signal. The frequencies from local supply source 3 are represented at 14 and 15. These are of a low frequency corresponding to the original envelope frequency which produced side-bands 11 and 12. By application of this locally supplied energy to the mixer circuit modulation of carrier 10 by these signals takes place so that they will appear as shown at dotted lines 16 and 17. If the delay device is not properly adjusted they will be at a different phase from side-bands 11 and 12 and are represented in this fashion by showing them at an angle to these lines. By adjustment of variable delay device 4 the components 16 and 17 may be brought into phase coincidence extending in effect the side-bands 12 and 13 to the maximum as indicated in the figure. If on the other hand the delay device 4 is adjusted to provide the signal energy in inverted relationship then upon adjustment to phase coincidence they will appear as incoming side-bands substantially equal and opposed to 11 and 12 as shown.

It will be clearly understood that the energy at signal source 1 may be derived in a number of ways. For example, it may be regularly repeated signal such as will be obtained from a rotatable directive antenna used in radio direction finders. The wave pattern may be of any predetermined form it being simply necessary that this wave form be known or at least reproducible at the local station and provide the proper wave form in the local supply station. It is therefore clear that a system of this type may be used for reception of coded signals wherein the signals are of a given known shape. These signals may then be transmitted from some remote point and a local source provided at the receiver producing the same wave form as that produced at the distant source. Thus if some particular point or time positioning of the received patterns is sufficient to give the signal indication this may be readily obtained by adjusting the timing of the energy from the local supply source in the coincidence with that from the signal wave. The mixing is preferably in the form of multiplication which can be obtained by various types of modulator circuits.

Figure 3:
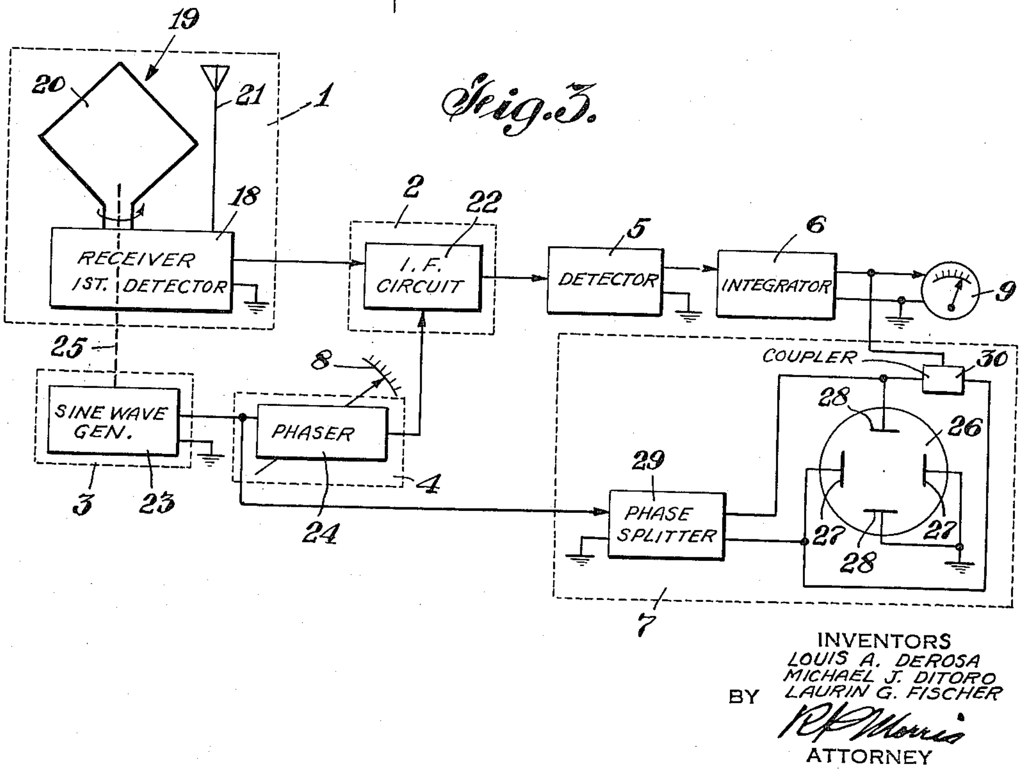
Fig. 3 is a schematic block diagram of a direction finder circuit incorporating the features of this invention.

In Fig. 3 is shown a direction finder arrangement utilizing the principles as described in connection with Fig. 1. In this circuit the signal carrier source 1 comprises a radio receiver 18 to which is coupled an antenna system 19 which may comprise rotatable loop 20 and sense antenna 21. If these antennas are properly adjusted to provide substantially a cardioidal pattern then the received radio frequency energy will be modulated to provide a substantially regularly repeated sinusoidal modulation which will produce side-bands. The mixer 2 may comprise an intermediate frequency circuit 22. The local supply source 3 comprises a sine wave generator 23 the output of which is supplied to the variable delay device 4 comprised of a phase shifter 24. The sine wave generator 23 is shown as being synchronized with the rotation of loop 20 by means of the shaft connection 25. Accordingly the wave generated by 23 will have the same frequency as the modulation frequency of the carrier wave present in the receiver 18. The output of phase shifter 24 is applied to circuit 22 to modify the intermediate frequency and produce therein side-bands corresponding to the signal side-bands incoming at the receiver. By adjustment of phase shifter 24 these sidebands may be brought into coincidence as explained above. The output of intermediate frequency 22 is applied to detector 5 and hence to integrator 6 which may, for example, constitute a low pass filter. The output of integrator 6 is applied to a meter 9 and also may be applied to utilization circuit 7. In the example shown utilization circuit 7 comprises a cathode ray tube direction finder indicator. The cathode ray tube 26 is supplied with the normal deflection plates 27, 28 and energy from generator 23 may be also applied to phase splitter 29. The phase split energy is applied to plates 27 and 28 to effect a rotation of the cathode beam in synchronism with loop 20. Output energy from integrator 6 is applied through a coupler 30 to the deflection plates of cathode ray indicator so as to control the beam in accordance with the received signal. It will be understood that for direction finder purposes the utilization circuit 7 may be omitted it simply being necessary to adjust phase shifter 24 until meter 9 reads a maximum or minimum reading indication at which time the direction of the received signal may be indicated on scale 8. The delay device scale may be desirable since it will permit direction finder readings for strong signals without the use of the correlating energy from generator 23.

Figure 4:
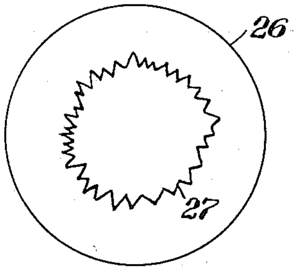
Figs. 4 and 5 are illustrations of cathode ray indicator screens used in explaining the circuit of Fig. 3.
Figure 5:
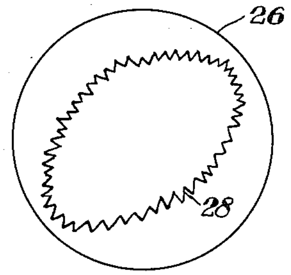

Figs. 4 and 5 show typical examples of directional indications of a cathode ray indicator such as 26 in the presence of strong noise. Fig. 4 for example, shows an energy pattern which may be obtained on a cathode ray indicator 26 when the signal present is very small with respect to the noise level. Thus the pattern 27 traced on the indicator appears to be substantially a circle. The noise modulations being such as to swamp out substantially the signal. However, with the same signal-to-noise ratio and with the generator 23 and phase shifter 24 as provided the pattern on the oscilloscope may assume the form shown at 28 on Fig. 5 which provides a directional indication. This can be read directly from the indicator without the use of a meter although the sharpness of the directional indication is considerably reduced. Thus even without the meter 9 the utilization circuit could be used for directional indications. However, by the adjustment of the delay device until the meter 9 reads a maximum a much better bearing may be obtained.

In direction finder equipment of the type shown tests have shown that readable bearing indications may be obtained on a direction finder incorporating these principles even when the signal-to-noise ratio is as bad as 1:20. While performance at such high noise-to-signal values is not entirely reliable excellent readings were obtained with signal-to-noise ratios as low as 1:9.

Figure 6:
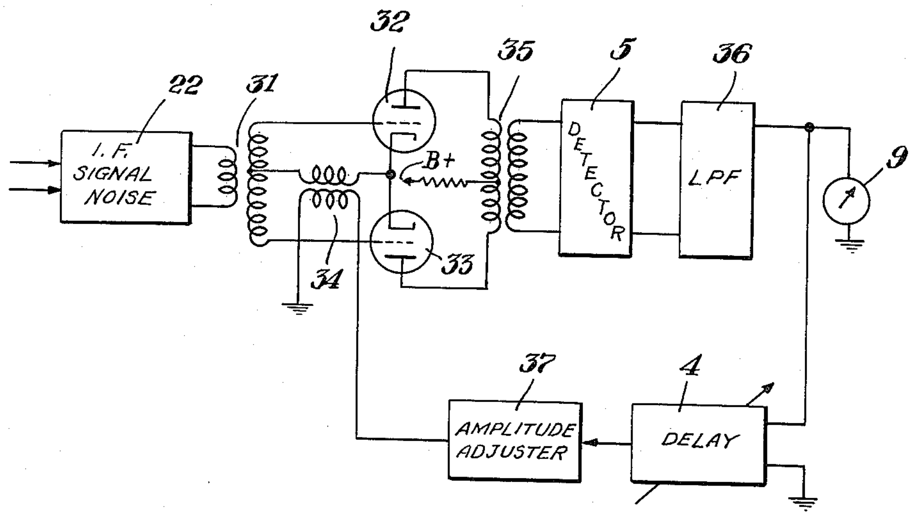
Fig. 6 is a modified schematic circuit diagram illustrating how the locally supplied wave may be derived from the incoming wave and applied to a balanced modulator circuit.

As was poined out above the mixing circuit may comprise many different forms of circuit. In Fig. 6 is shown an arrangement incorporating the features of our invention utilizing a balanced modulator arrangement as the mixer circuit. Here the output of an intermediate frequency circuit 22 is applied over transformer 31 in push-pull to the grids of a pair of amplifier tubes 32 to 33. In Fig. 6 an arrangement is shown wherein the locally supplied signal is derived from the supplied signal to provide correlation instead of cross-correlation as was shown in Fig. 3. It will be understood however that these types of signal correlation may be interchangeably used in the various circuits. The locally supplied signal envelope is applied to the balance modulator over the transformer 34 which energizes the grid of tubes 32 and 33 in parallel. Since the output of tubes 32 and 33 are normally in opposition in the primary of output transformer 35 the carrier wave incoming over intermediate frequency source as well as the noise energy therein will be suppressed so that appearing in the output of transformer 35 will be simply the side-band energy of the received signal as modulations of the carrier frequency and any noise components that are present. These carrier side-bands are detected in the detector circuit 5 and applied over the integrator consisting of the low pass filter 36 to indicating meter 9. This output energy from low pass filter 36 will consist substantially of the noise free modulation pattern incoming over signal noise generator 22 and the pattern of modulations supplied from transformer 34 and the balanced modulator. This output energy is so delayed in a delay device 4 and controlled in amplitude in an amplitude adjuster 37, if desired, to furnish the locally supplied correlating signal. In this case some of the noise still will go past the circuit since the locally supplied source is not completely noise free. This may not be of significant amplitudes however. By adjustment of the delay device 4 a maximum indication can readily be obtained in meter 9. It is clear that other utilization circuits may be also connected in the output of the apparatus as shown herein if desired.

Figure 7:
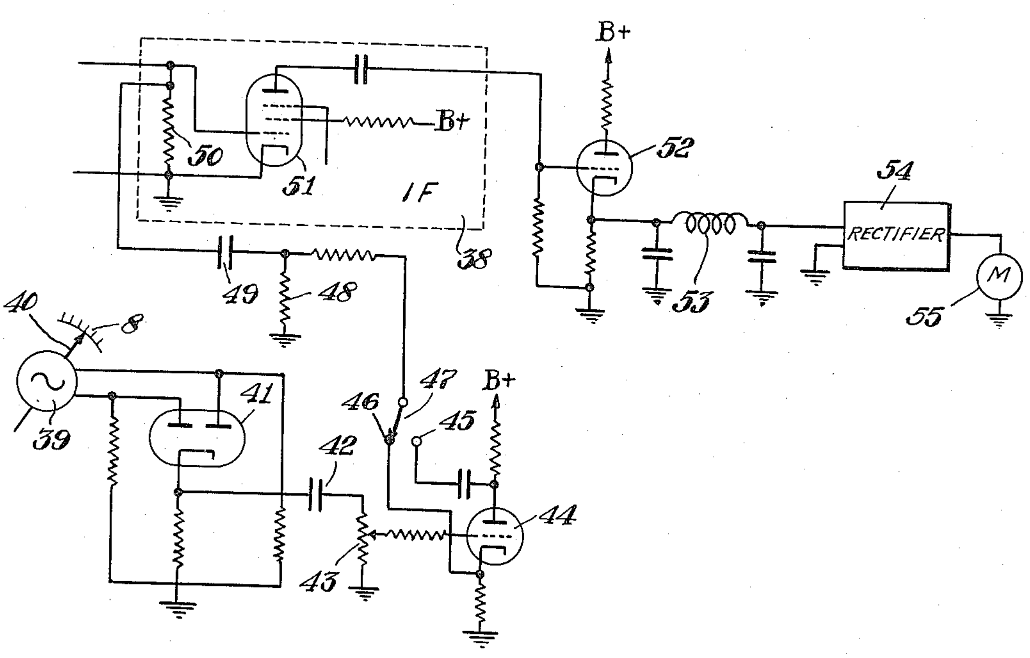
Fig. 7 is a schematic circuit diagram of a correlation system wherein the locally supplied wave is applied as a volume control to a stage of the intermediate frequency amplifier.

In Fig. 7 is shown a further modified circuit incorporating the features of this invention. In this case the mixer circuit comprises an intermediate frequency amplifier 38. It may be assumed here that the input to this amplifier is modulated with a signal envelope of sinusoidal form as derived from direction finder antenna system such as found in Fig. 3. The local supply source may comprise a sinusoidal generator 39 which may be adjusted in phase as indicated by the arrow 40. This output energy is rectified in full wave rectifier 41. The output energy from rectifier 41 is coupled from the cathode over the coupling condenser 42 and volume control potentiometer 43, to the input grid of amplifier tube 44. From amplifier tube 44 the plate output may be obtained at terminal 45 and the cathode output at 46. A switch 47 is provided to be connected selectively to terminal 45 or 46. This terminal is then coupled through resistors 48 and condenser 49 to a volume control grid resistor 50 of the intermediate frequency amplifier tube 51. The input signal is also applied between the control grid and cathode of tube 51. Thus, there is accomplished in this tube a mixing of the intermediate frequency signal modulated energy and the locally supplied energy to furnish the desired side-band modulating components. Amplifier tube 51 may be followed by any desired number of amplifying stages, the output of which is coupled to the detector tube 52. The cathode follower output of tube 52 is coupled over low pass filter 53 to a rectifier 54 and from there to a direct current meter 55. It will be clear that in this case the control of phase of the local supply source can be obtained directly at generator 39. The amplitude of this energy may be adjusted at potentiometer 43. By means of switch 47 energy may be supplied from the cathode terminal 46 for one phase relationship of the energy at tube 51 and from terminal 45 it will be supplied in inverted phase. Thus meter 55 will be read to obtain maximum or minimum of the energy depending upon switch 47.

Figure 8:
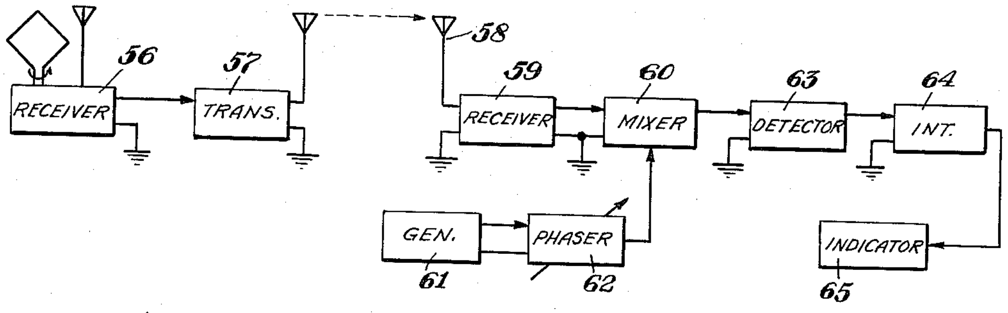
Fig. 8 is a block schematic diagram illustrating the application of this invention to the reception of transmitted waves having a given signal pattern.

In Figure 8 is disclosed an arrangement wherein the modulation frequency is supplied from a remote radiator source instead of locally as by a rotation of a direction finder antenna. In this instance the simple sinusoidal pattern of a cardioidal direction finder system has again been shown although it will be apparent that any wave form may be used for this transmitted signal if desired. A direction finding receiver is shown at 56 from which will be derived an envelope wave corresponding to the cardioidal pattern. This wave is used to modulate a transmitter 57 the energy of which is radiated to a receiving antenna 58 which may be located at a point where it is desired to telemeter the readings to this direction finder. Energy from antenna 58 is applied over receiver 59 to a mixer 60. The energy as received at antenna 58 may have present considerable noise due to atmospheric conditions or other disturbances. A local generator 61 is provided which produces a wave form substantially identical with the modulation envelope of the carrier transmitted over transmitter 57. This energy may be controlled through an adjustable phaser or time delay circuit 62 and applied to mixer 60. Here again there will be obtained a second modulation of the intermediate frequency or the carrier frequency of the energy received at antenna 58 and an adjustment may be made of phaser 62 to correlate the side-band energy as previously described. This energy may be detected in detector 63. integrated at integrator 64 and applied to an indicator 65.

Figure 9:
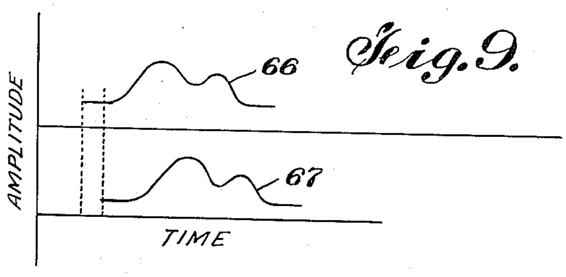
Fig. 9 is a graphical representation of wave form used in explaining the operation of a system in accordance with Fig. 8.

While we have shown in Fig. 8 a circuit producing a sine wave component, it will be clear that the system shown in this arrangement may readily be adapted for the transmission of coded messages between a transmitter and receiver at points where high level interference may be expected. Instead of a direction finding receiver 56 some form of pre-arranged coding wave generator may be provided. This may have any desired arbitrary wave form, for example, it may take the form shown by curve 66 of Fig. 9. The local generator 61 will then be designed to provide a locally generated wave 67 having identically the same wave form as that used at the transmitter. By providing at the transmitter and receiver desired patterns for developing the particular coded waves, correlation may be used for transmitting the message even though the noise level exceeds the desired signal level.

While the systems described above have all been made in connection with amplitude modulated signals, it is clear that the principles thereof apply to other types of modulation. For example, frequency wobble modulation may be used if desired it being then necessary to produce a frequency wobbled correlating wave of the same form as that used in the original modulation. Any type of modulation may be employed so long as the pattern is predetermined to such an extent that it may be reproduced locally for the purpose of correlating the wave.

In the system as so far described correlation has been effected directly between the modulation pattern and the corresponding locally supplied wave. If desired however the locally derived wave may be differentiated before combining in the correlation circuit. In this case, the locally generated wave will pass through zero at the point where there is no variation, which in general will be the maximum point of the original signal envelope. For some purposes this type of correlation may be preferable to that as described above. Such a system has been illustrated by way of example in Figs. 10 and 11.

Figure 10:
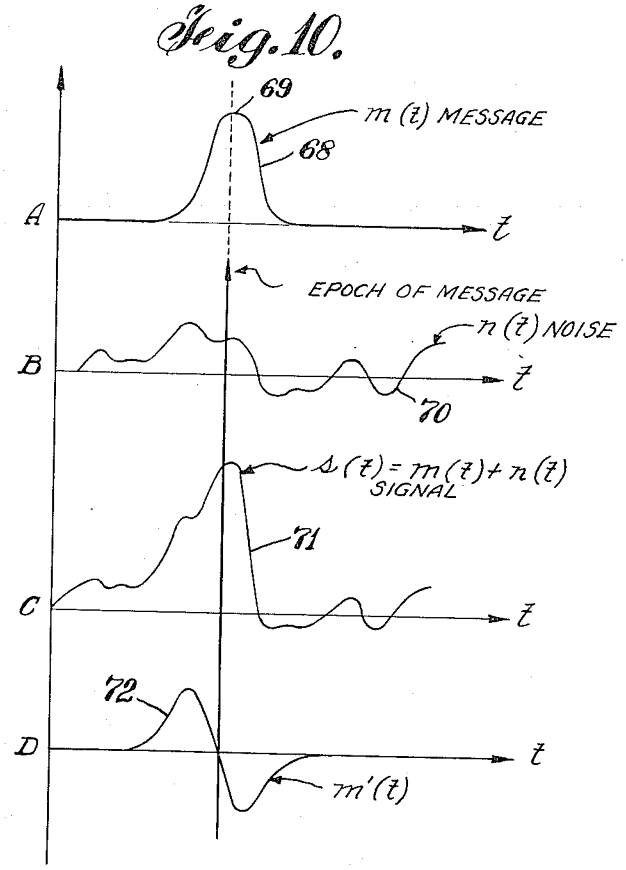
Fig. 10 is a graphical representation illustrating the operation of the system for a differentiated locally supplied wave.

Turning first to Fig. 10, graph A may represent a wave form comprising a message as indicated by curve 68. This message may be conveyed by control of the timing, for example of the maximum point or epoch of the message, as indicated at 69. There may be present also a noise component as represented by curve 70 in graph A. Thus the total received signal plus noise will take the wave form shown at curve 71, graph C. The locally supplied signal will have the form of curve 68, graph A, the first differential of which is represented by curve 72, graph D. It will be noted here that this differentiated curve passes through zero at the epoch point 69. It will also be noted in curve 71 that this epoch point has apparently been shifted due to the noise signal in the received signal wave. Thus it would not be possible readily to obtain the message from the received wave itself. Further, it will be noted that the differential is positive to the right of the epoch point and negative to the left thereof. Thus when this locally generated wave and the received signal are multiplied together the energy to the right will be positive while that to the left will be negative. Thus if the locally generated wave is not centered either the positive or negative signal will predominate. However, precisely, at the center point there will be zero signal output so that adjustment may be made.

Figure 11:
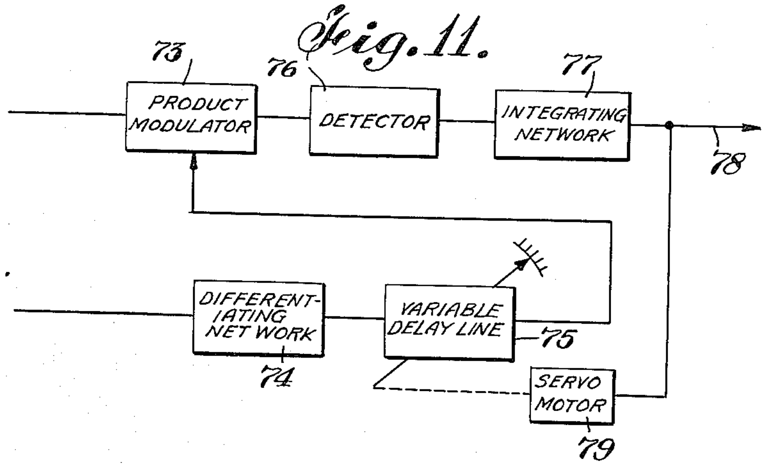
Fig. 11 is a block circuit diagram for use with signals of the type shown in Fig. 10.

The block circuit diagram for use of this system is shown in Fig. 11. Here the signal modulated carrier is applied to product modulator 73. The locally generated wave is applied through network 74 and the variable delay device 75 to product modulator 73. The output of product modulator 73 is detected at detector 76 and integrated at integrating network 77 for application over line 78 to a utilization or indicating circuit.

In view of the features explained above concerning the zero adjustment, this system lends itself readily to automatic or self-alignment. Thus the output energy from integrating network 77 may be applied to a servomotor 79 which in turn will serve to adjust variable delay line 75.

It will be readily apparent that this differentiating system is applicable to the various forms of the device previously described. It will also be clear that many modifications and changes may be made in the apparatus in accordance with this invention without departing from the substance thereof.

By making the correlation at a carrier frequency instead of doing it at the envelope frequency certain advantages are obtained. By this type of arrangement noises introduced in the detector are not present at the time the correlation is done and therefore will not enter into the consideration thereof. Furthermore, it is easier to amplify the intermediate frequency or other carrier frequencies than the very low carrier frequency which may be present in the signal energies received.

While we have described above the principles of our invention in connection with specific apparatus, it is to be clearly understood that this description is made only by way of example and not as a limitation to the scope of our invention.

We claim:

1. In a radio receiver system having means for receiving a radio wave having a carrier frequency and side band components representing a predetermined modulation signal wave in the presence of received interference energy, a local signal supply source for supplying a local signal wave having substantially the same form as said predetermined modulation signal wave, means for modulating the modulated carrier frequency of the receiver radio wave by said locally supplied wave to produce additional side band components corresponding to said locally supplied wave and means for adjusting the timing of said locally supplied wave to provide a coincidence between said produced sidebands and the sidebands of said received radio wave.

2. A system according to claim 1, further comprising detector means for detecting the output energy of the modulated radio wave and means for integrating said detected energy.

3. A system according to claim 1, further comprising means for differentiating said locally supplied wave prior to modulating said radio wave.

4. In a radio receiver system for receiving a radio wave having a carrier frequency and side band components representing a predetermined modulation signal wave in the presence of received interference energy, a local signal supply source for supplying a local signal wave having substantially the same form as said predetermined modulation signal wave, means for deriving energy of said predetermined modulation signal wave for said supply source from said received wave, means for modulating the modulated carrier frequency of said radio wave by said locally supplied wave to produce additional side band components corresponding to said locally supplied wave and means for adjusting the timing of said locally supplied wave to provide a coincidence between said produced side bands and the side bands of said received energy.

5. In a radio receiver system for receiving a radio wave having a carrier frequency and side band components representing a predetermined sinusoidal modulation signal wave in the presence of received interference energy, a local signal supply source for supplying a signal wave having a sinusoidal form substantially the same as said modulation signal wave, means for modulating the modulated carrier frequency of said radio wave by said locally supplied wave to produce additional side band components corresponding to said locally supplied wave and means for adjusting the phase of said locally supplied wave to provide a coincidence between said produced side bands and the side bands of said received radio wave.

6. In a radio direction finder receiver system for receiving a radio wave having a carrier frequency and side band components representing a predetermined direction indicating modulation signal wave in the presence of received interference energy, a local signal supply source for supplying a signal wave having substantially the same form as said direction indicating modulation signal wave, means for modulating the received carrier wave by said locally supplied wave to produce additional side band components corresponding to said locally supplied wave, means for adjusting the timing of said locally supplied wave to provide a coincidence between said produced side bands and the sidebands of said received energy, and means for providing a direction indication in response to said coincidence.

7. In a system for providing an indication of the epoch of a signal of predetermined wave form present in the form of modulation side bands of a received modulated carrier frequency wave comprising a source for locally supplying a wave of said predetermined wave form, means for producing side bands of said modulated carrier frequency wave in response to said locally supplied wave, means for adjusting the timing of said produced side bands to correspond in timing with said modulation side bands, detector means for detecting the doubly modulated carrier frequency wave to derive side band energy therefrom, and means to integrate said detected side band energy.

8. A system according to claim 7, further comprising means to differentiate said locally produced wave prior to producing of said side bands.

9. A system according to claim 8, further comprising a reversible drive means coupled to said timing means, and means responsive to the outputs of said integrating means for operating said drive means to adjust said timing means to side band coincidence.

10. A system according to claim 7, wherein said side bands are produced by modulation of said carrier by a signal wave form of predetermined coded form, said source for supplying said wave comprising means for producing a wave of said predetermined coded form.

11. A system according to claim 7, further comprising an indicating apparatus coupled to said integrating means.

12. A system according to claim 11, further comprising adjustment indicating means on said means for adjustment, whereby the indication of adjustment at the point where a maximum indication on said indicating means provides information as to the epoch of said signal.

13. A system according to claim 11, further comprising adjustment indicating means on said means for adjustment whereby the indication adjustment at the point where a minimum indication on said indicating means provides information as to the epoch of said signal.

14. A system according to claim 7, wherein said source of locally produced waves comprises means coupled to the outputs of said integrating means.

15. A system according to claim 7, wherein said means for producing side bands comprises a modulator circuit, means for applying said side band modulated carrier to said modulator and means to apply said locally supplied wave to said modulator to modulate said applied carrier.

16. A system according to claim 15, wherein said modulator is a balanced modulator, said carrier being applied thereto in push-pull, and said locally supplied signal being coupled thereto in parallel.

17. A system according to claim 15, wherein said modulator comprises an amplifier tube, and said means to apply said locally supplied signal comprises a coupling to control amplification of said amplifier tube in accordance with the wave envelope energy.

18. A system according to claim 7, wherein said signal comprises a signal of sine wave form, and said means for adjusting the timing comprises an adjustable phase shifter.

19. A system according to claim 18, further comprising means to adjustably control the amplitude of said locally supplied wave.

References Cited in the file of this patent

UNITED STATES PATENTS

| | | |
|---|---|---|
| 1,315,539 | Carson | Sept. 9, 1919 |
| 2,161,764 | Minton | June 6, 1939 |
| 2,233,384 | Feldman | Feb. 25, 1941 |
| 2,426,187 | Earp | Aug. 26, 1947 |
| 2,471,418 | Earp | May 31, 1949 |